US011946793B2

(12) United States Patent
Xu et al.

(10) Patent No.: US 11,946,793 B2
(45) Date of Patent: Apr. 2, 2024

(54) SELF-EXCITED WET GAS FLOW MEASURING DEVICE

(71) Applicant: SEA PIONEER TECHNOLOGIES CO., LTD., Jiangsu (CN)

(72) Inventors: Bin Xu, Jiangsu (CN); Chao Luo, Jiangsu (CN); Jingyang Li, Jiangsu (CN); Jige Chen, Jiangsu (CN)

(73) Assignee: SEA PIONEER TECHNOLOGIES CO., LTD., Jiangsu (CN)

( * ) Notice: Subject to any disclaimer, the term of this patent is extended or adjusted under 35 U.S.C. 154(b) by 454 days.

(21) Appl. No.: 17/382,361

(22) Filed: Jul. 22, 2021

(65) Prior Publication Data

US 2021/0348959 A1    Nov. 11, 2021

Related U.S. Application Data

(63) Continuation of application No. PCT/CN2019/080008, filed on Mar. 28, 2019.

(30) Foreign Application Priority Data

Jan. 22, 2019   (CN) .......................... 201910059610.1

(51) Int. Cl.
  *G01F 3/30*   (2006.01)
  *B01D 45/16*  (2006.01)
  (Continued)

(52) U.S. Cl.
  CPC .............. *G01F 3/30* (2013.01); *B01D 45/16* (2013.01); *B01D 46/0012* (2013.01);
  (Continued)

(58) Field of Classification Search
  CPC ........ G01F 3/30; G01F 15/005; G01F 15/125; G01F 15/08; G01F 1/00; G01F 7/00;
  (Continued)

(56) References Cited

U.S. PATENT DOCUMENTS 3,447,290 A * 6/1969 Flory ..................... B01D 45/14
                                                                55/432
4,840,732 A * 6/1989 Rawlins ............. B01D 17/0217
                                                                210/512.1
5,407,584 A * 4/1995 Broussard, Sr. ..... B03D 1/1412
                                                                210/512.1

FOREIGN PATENT DOCUMENTS

CN   201554460   8/2010
CN   202381066   8/2012
(Continued)

OTHER PUBLICATIONS

CN106194150A-English Machine Translation (Year: 2016).*
(Continued)

*Primary Examiner* — Madeline Gonzalez
(74) *Attorney, Agent, or Firm* — Cooper Legal Group, LLC

(57) ABSTRACT

A self-excited wet gas flow measuring device, including a housing (1), the housing (1) is provided with a wet gas inlet (21), a dry gas outlet (23) and a liquid outlet (25); the middle of the housing (1) is mounted with a mist catching filter screen to divide a hollow cavity inside the housing (1) into a dry gas region (33) and a wet gas region (34); the wet gas inlet (21) and the liquid outlet (25) are both disposed in the wet gas region (34), and the dry gas outlet (23) is disposed in the dry gas region (33); a gas flowmeter (41) for metering the transmitted dry gas is provided at the dry gas outlet (23), a control device (51) is provided within the wet gas region (34), and a detection counting device (52) is provided at the liquid outlet (25).

10 Claims, 3 Drawing Sheets

(51) Int. Cl.
  *B01D 46/00* (2022.01)
  *B01D 46/10* (2006.01)
  *B01D 46/62* (2022.01)
  *B01D 50/00* (2022.01)
  *B01D 50/20* (2022.01)
  *G01F 15/00* (2006.01)
  *G01F 15/12* (2006.01)

(52) U.S. Cl.
  CPC ............ *B01D 46/10* (2013.01); *B01D 46/62* (2022.01); *B01D 50/20* (2022.01); *G01F 15/005* (2013.01); *G01F 15/125* (2013.01)

(58) Field of Classification Search
  CPC ..... G01F 11/32; B01D 45/16; B01D 46/0012; B01D 46/10; B01D 46/62; B01D 50/20; B01D 46/2411
  USPC ......... 210/232, 97, 104, 109, 121, 123, 150, 210/151, 188, 242.1, 314, 455, 512.1, 210/DIG. 6, 86, 360.1, 787, 788
  See application file for complete search history.

(56) References Cited

FOREIGN PATENT DOCUMENTS

| | | |
|---|---|---|
| CN | 202605959 | 12/2012 |
| CN | 204307456 | 5/2015 |
| CN | 205287727 | 6/2016 |
| CN | 106194150 | 12/2016 |
| CN | 109990857 | 7/2019 |
| JP | 2012206064 | 10/2012 |

OTHER PUBLICATIONS

"International Search Report (Form PCT/ISA/210) of PCT/CN2019/080008", dated Oct. 22, 2019, with English translation thereof, pp. 1-6.

* cited by examiner

SELF-EXCITED WET GAS FLOW MEASURING DEVICE

CROSS-REFERENCE TO RELATED APPLICATION

This application is a continuation of international application of PCT application No. PCT/CN2019/080008 filed on Mar. 28, 2019, which claims the priority benefit of China application No. 201910059610.1 filed on Jan. 22, 2019. The entirety of each of the above-mentioned patent applications is hereby incorporated by reference herein and made a part of this specification.

BACKGROUND

Technical Field

The present application relates to the technical field of wet gas measurement, and more particularly, to a self-excited wet gas flow measuring device.

Description of Related Art

In the process of oil and gas production, wet gas is a common form. The measurement of wet gas to obtain the flow of gas and liquid is the demand for oil and gas production. The wet gas is a special form of gas-liquid two-phase flow, which is widely present in industrial production processes. It is generally believed that in gas-liquid two-phase flow, the gas phase is a continuous phase, and the liquid phase is a flow state in a discrete phase as a wet gas. The wet gas generally refers to those with a volumetric liquid content of less than 5%. The manner of gas-liquid two-phase flow and distribution in the pipe is called as flow pattern. The flow pattern is an intuitive manifestation of the energy state and interaction of the gas-liquid two-phase. Due to the large differences in the density, velocity, and viscosity of the two phases, the interface between the phases is caused randomly variable, presenting a complex and changeable flow pattern. The flow pattern is summarized into several typical flow patterns from a macro perspective. The gas-liquid two-phase flow generally shows fine bubble flow, slug flow, block flow, liquid beam annular flow, and annular flow when flowing in the vertical and upward direction, and may be divided into fine bubble flow, gas plug flow, stratified flow, wavy stratified flow, aeroelastic flow and annular flow in the case of horizontal flowing.

There are special wet gas flowmeter methods for wet gas measurement; among them, a wet gas flowmeter usually uses a differential pressure flowmeter. The measuring method of the differential pressure flowmeter is currently the most widely used flowmeter in wet gas measurement, and it is recognized as a measuring device that can work stably and reliably under various flow patterns of wet gas. When the differential pressure flowmeter is used for wet gas measurement, due to the existence of the liquid phase, the differential pressure value is larger than when the gas phase flows alone, that is, falsely high. There are two reasons for the false height: one is the extra accelerated pressure drop caused by the blocking effect of the liquid phase; the other is the friction pressure drop caused by the acceleration of the gas relative to the liquid phase. A large number of studies have shown that the false height characteristics of the differential pressure flowmeter have good repeatability, so the corresponding correction model can be used to correct it to obtain the true gas flow; the measurement of the gas flow needs to be obtained through a large number of experiments corresponding correction model data, so the overall design is very responsible.

At the same time, in the measurement process of the liquid phase medium, because its liquid content is at a relatively low level, if it is necessary to ensure good accuracy in the liquid phase measurement, the accuracy of an instrument is required to be very high, so that it is difficult to meet user needs. For example, in the state of 5% liquid content, to achieve the accuracy of liquid volume measurement accuracy not less than 1%, the gas-liquid fraction must reach an accuracy of 0.05*0.01=0.0005. The lower the liquid content, the higher the accuracy requirements. However, in practice, such high accuracy is difficult to achieve, so there is a certain room for improvement in the gas flow and liquid flow measurement equipment.

SUMMARY

The purpose of the present application is to provide a self-excited wet gas flow measuring device, which can realize gas and liquid separate measuring, make the measurement simpler and more accurate.

The above-mentioned technical purpose of the present application is achieved through the following technical solutions.

A self-excited wet gas flow measuring device, comprising a housing, the housing is provided with a wet gas inlet for introducing a wet gas, a dry gas outlet for outputting a dry gas and a liquid outlet for outputting a liquid; the middle of the housing is mounted with a mist catching filter screen to divide a hollow cavity inside the housing into a dry gas region and a wet gas region; the wet gas inlet and the liquid outlet are both disposed in the wet gas region, and the dry gas outlet is disposed in the dry gas region; a gas flowmeter for metering the transmitted dry gas is provided at the dry gas outlet, a control device for controlling the opening and closing of the liquid outlet and quantitatively outputting the liquid is provided within the wet gas region, and a detection counting device for detecting whether there is a liquid output and counting is provided at the liquid outlet.

By using the above technical solution, the wet gas is separated through the mist catching filter screen to form the dry gas and the liquid, and the two are respectively measured, that is, the dry gas is measured through the gas flowmeter, and the liquid is transmitted through quantitative control and the amount of liquid is measured by counting the number of discharges. The entire measuring method is simple and novel, and the feasibility of the operation is high. At the same time, the gas and the liquid are separated, so that detection and metering can be performed more accurately, and mutual interference is avoided.

Further, the wet gas inlet accesses to the inside of the housing along the tangential direction of the outer wall of the housing.

By using the above technical solution, the wet gas passes through the wet gas inlet and enters the housing along the tangent direction of the outer wall of the housing. The wet gas flows along the inner wall of the housing to form a swirling flow. At the same time, the liquid in the wet gas is thrown to the inner wall of the housing due to centrifugal action, and under the action of gravity, flows down along the inner wall to the bottom of the housing.

Further, the mist catching filter screen is provided with at least two layers, and a gap is formed between any two layers of the mist catching filter screens.

By using the above technical solution, the gap is provided among the multiple layers of the mist catching filter screen, so that the wet gas can be defogged layer by layer, and the provision of the gap can make the dry gas full contact the mist catching filter screen as much as possible so as to reduce the liquid content in the dry gas as much as possible to improve the accuracy of the dry gas and the liquid detection.

Further, the mist catching filter screen is provided with two layers, respectively defined as a first filter screen and a second filter screen, wherein the first filter screen is a plate-shaped mist catching filter screen and the second filter screen is a cylindrical mist catching filter screen, the first filter screen is provided on the upper side of the second filter screen, and the wet gas inlet is disposed on the lower side of the second filter screen.

By using the above technical solution, two-layer setting can not only ensure the accuracy of defogging, but also can adapt to a small environment, and can reduce costs; and the second filter screen is a cylindrical mist catching filter screen, which can make the wet gas in the case of swirling flow in contact with the cylindrical mist catching filter screen at a largest possible area to improve the efficiency of defogging. Due to the longer length of the cylindrical mist catching filter screen, the wet gas after entering the mist catching filter screen can be fully carried out by the defogging process, and the liquid in the wet gas can be removed as much as possible to improve the accuracy of separation.

Further, the first filter screen is fixedly connected to the inner wall of the housing, the housing is provided with a connecting plate for fixing the second filter screen and keeping the second filter screen coaxially arranged with the housing, and the wet gas inlet is disposed on the lower side of the connecting plate.

By using the above technical solution, the second filter screen and the housing are in a coaxial arrangement, that is, the second filter screen is disposed in the center of the housing, which can further ensure that the wet gas can flow around the second filter screen after forming a swirling flow, and during the flow, it can be fully in contact with the second filter screen. The provision in the center position can effectively avoid the problem of excessive defogging in some positions caused by eccentric setting and reducing efficiency.

Further, the control device includes a flap cover drain valve and a float, an end of the flap cover drain valve is interconnected with the inner wall of the housing and the other end thereof seals the liquid outlet, the density of the flap cover drain valve is less than the density of the liquid; a connecting piece is provided between the float and the flap cover drain valve so as to achieve a joint movement.

By using the above technical solution, a mechanical quantitative control structure is used to achieve quantitative control of the liquid output, that is, the float and the flap cover drain valve structure are used to achieve quantitative control. Because the density of the flap cover drain valve is less than the density of the liquid, when the liquid surface exceeds the flap cover drain valve, buoyancy can be generated; when the liquid surface reaches a certain height, the float provides a pulling force to the flap cover drain valve through the connecting piece and combines with the buoyancy of the flap cover drain valve to ensure that the flap cover drain valve can be opened quantitatively and the flap cover drain valve can be opened for drainage when the liquid reaches the preset height. After the liquid is drained, based on the gravity of the float and the flap cover drain valve itself, the liquid outlet is closed.

Further, a side of the float close to the mist catching filter screen is provided with a guide slope that is obliquely arranged downward along a direction from the central axis of the float to the outside of the float, and there is a gap between the outer wall of the float and the inner wall of the housing.

By using the above technical solution, the guide slope on the float can guide the liquid flowing down from the second filter screen into the housing, avoiding the liquid surface sloshing due to dripping of a large amount of the liquid and affecting the stability of the float's measurement of the position. Since the second filter screen is disposed in the center of the housing, if the size of the float is set to be small, the liquid surface will slosh when a large amount of the liquid drips into the liquid surface. At this time, due to the size of the float smaller, it will cause the float to slosh as the liquid surface sloshes. At this time, the position of the sloshing float cannot be accurately determined, that is, the flap cover drain valve will be pulled in advance during the sloshing to discharge, causing the problem of inaccurate measurement. Therefore, setting the size close to the inner diameter of the housing can prevent the droplets from directly dripping on the liquid surface and causing instability. Now, the slow guide through the guide slope into the liquid can reduce the sloshing situation as much as possible to stabilize the liquid surface.

Further, the control device includes a float, a sealing sleeve and a connecting rod connected between the float and the sealing sleeve, the float is disposed in the wet gas region, the sealing sleeve is disposed in the dry gas region and is aligned with the dry gas outlet so as to close the dry gas outlet or open the dry gas outlet under the drive of the float.

By using the above technical solution, a mechanical quantitative control structure is used to achieve quantitative control of the liquid output, that is, the float is used to rise when the liquid increases to drive the sealing sleeve close the dry gas outlet through the connecting rod; continue to introduce the wet gas at this time, so that the air pressure in the housing increases, so that the liquid accumulated inside is eliminated through the internal air pressure, and quantitative control is achieved.

Further, a dry gas transmission pipeline is connected at the dry gas outlet, a liquid transmission pipeline is connected at the liquid outlet, the dry gas transmission pipeline and the liquid transmission pipeline communicate with each other, a wet gas transmission pipeline is connected at the communication of the dry gas transmission pipeline and the liquid transmission pipeline.

By using the above technical solution, the wet gas is separated and collected again for transmission, that is, the detection process will not affect the wet gas transmission process. Only a set of detection equipment is added during the transmission process to improve the feasibility of the overall plan.

Further, the liquid transmission pipeline includes a siphon pipe and a connecting pipeline, an end of the siphon pipe is communicated with the liquid outlet and the other end thereof is connected with an end of the connecting pipeline, the other end of the connecting pipeline is communicated with the dry gas transmission pipeline; the middle of the siphon pipe is arranged obliquely upward.

By using the above technical solution, after the flap cover drain valve is opened, the liquid can quickly enter the siphon pipe, and the siphon pipe filled with the liquid forms a siphon to drain all the effusion to achieve one detection.

In summary, the beneficial technical effects of the present application are:

1. the principle of swirling flow separation is utilized to realize gas-liquid measuring separately, and the metering of liquid volume can realize by counting the number of discharges, which is more accurate and is easy to detect.

DESCRIPTION OF THE EMBODIMENTS

The present application will be further described in detail below in conjunction with the drawings.

Figure 1:
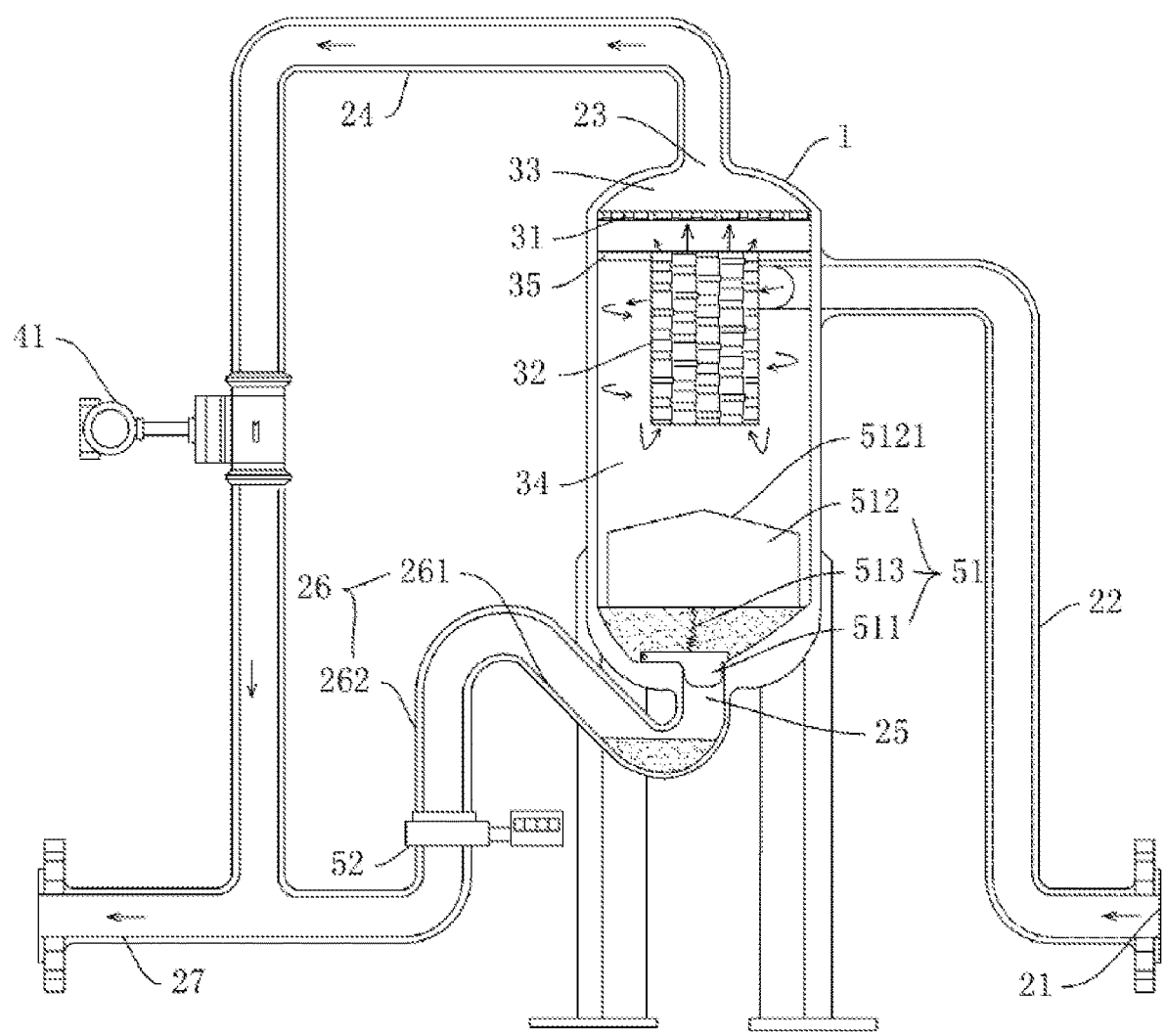
FIG. 1 is a schematic structural diagram of a mechanical control according to an embodiment of the present application.

Referring to FIG. 1, a self-excited wet gas flow measuring device disclosed by the present application is capable of separating the wet gas to form a dry gas and a liquid, and simultaneously metering the two separately. The entire metering method is simple and novel, and the operation feasibility is high. The gas and the liquid are separated, so that detection and metering can be performed more accurately, and mutual interference is avoided.

As shown in FIG. 1, the self-excited wet gas flow measuring device specifically includes a housing 1. The cross section of the housing 1 can be square, round, rhombus and other different shapes. In this embodiment, the housing 1 preferably adopts a circular cross section, that is, the housing 1 is cylindrical, and the housing 1 is installed vertically.

As shown in FIG. 1, the housing 1 is provided with a wet gas inlet 21 for introducing a wet gas. A wet gas introducing pipe 22 is connected at the position of the wet gas inlet 21. The wet gas inlet 21 accesses to the inside of the housing 1 along the tangential direction of the outer wall of the housing 1, so that the wet gas flows along the outer wall of the housing 1 to form a swirling flow. At the same time, the liquid in the wet gas is thrown to the inner wall of the housing 1 due to centrifugal action, and under the action of gravity, flows down along the inner wall to the bottom of the housing 1.

The housing 1 is further provided with a dry gas outlet 23 for outputting a dry gas and a liquid outlet 25 for outputting a liquid. A dry gas transmission pipeline 24 is connected at the dry gas outlet 23, and a liquid transmission pipeline 26 is connected at the liquid outlet 25. The dry gas transmission pipeline 24 and the liquid transmission pipeline 26 communicate with each other. A wet gas transmission pipeline 27 is connected at the communication of the dry gas transmission pipeline 24 and the liquid transmission pipeline 26. The liquid transmission pipeline 26 includes a siphon pipe 261 and a connecting pipeline 262. An end of the siphon pipe 261 is communicated with the liquid outlet 25 and the other end thereof is connected with an end of the connecting pipeline 262, the other end of the connecting pipeline 262 is communicated with the dry gas transmission pipeline 24, and the middle of the siphon pipe 261 is arranged obliquely upward.

As shown in FIG. 1, the wet gas is introduced into the housing 1 through the wet gas introducing pipe 22, and the dry gas and the liquid are separated through a preset separation device. The dry gas obtained by the separation is transmitted through the dry gas transmission pipeline 24, and the liquid obtained by the separation is transmitted through the liquid transmission pipeline 26.

In particular, the separation device includes a mist catching filter screen mounted in the middle of the housing 1. The mist catching filter screen can be set to one layer or multiple layers. If it is set to multiple layers, a gap is formed between any two layers of the mist catching filter screens. If the mist catching filter screen is provided with two layers, they are respectively defined as a first filter screen 31 and a second filter screen 32, wherein the first filter screen 31 is a plate-shaped mist catching filter screen, and the second filter screen 32 is a cylindrical mist catching filter screen. The first filter screen 31 is provided on the upper side of the second filter screen 32. In this embodiment, the first filter screen 31 may be used, the second filter screen 32 may also be used, or a combination of the first filter screen 31 and a second filter screen 32 may be used.

The mist catching filter screen separates the hollow cavity inside the housing 1 into a dry gas region 33 and a wet gas region 34; wherein the upper side of the uppermost filter screen is the dry gas region 33, and the lower side of the lowermost filter screen is the wet gas region 34. The wet gas inlet 21 and the liquid outlet 25 are both disposed in the wet gas region 34, and the dry gas outlet 23 is disposed in the dry gas region 33.

The first filter screen 31 is fixedly connected to the inner wall of the housing 1, where the first filter screen 31 can be integrally connected with the housing 1, or the first filter screen 31 can be fixed to the housing 1 through existing fixing methods such as bolts and buckles, and in this embodiment, a bolt fixing method is preferably adopted, and the fixing method is not shown.

The housing 1 is provided with a connecting plate 35, the second filter screen 32 is fixed through the connecting plate 35, and is maintained coaxially with the housing 1. The wet gas inlet 21 is disposed in the lower side of the connecting plate 35. Here, the connecting plate 35 and the housing 1 can be integrally connected, or through existing fixing methods such as bolts and buckles. In this embodiment, the integral connection, that is, welding, is preferred to ensure that there will be no gaps between the connecting plate 35 and the housing 1 to prevent the wet gas from leaking into the dry gas region 33. The fixing manner between the connecting plate 35 and the second filter screen 32 can be set as an integral connection, or through existing fixing methods such as bolts and buckles, and in this embodiment, a bolt fixing method is preferably adopted, and the fixing method is not shown.

As shown in FIG. 1, after the wet gas is separated by the separation device to obtain the dry gas and the liquid, the two need to be measured separately. The specific measuring structure design is as follows.

Regarding the metering of the dry gas, the dry gas transmission pipeline 24 is provided with a gas flowmeter 41 for metering the dry gas transmitted; the measuring detection of the dry gas is realized through the gas flowmeter 41.

Regarding the metering of the liquid, a control device 51 for controlling the opening and closing of the liquid outlet 25 and quantitatively outputting the liquid is provided in the housing 1 and is disposed in the wet gas region 34. The liquid transmission pipeline 26 is provided with a detection counting device 52 that detects whether there is a liquid output and counts; the detection counting device 52 uses sensors that distinguish between gas and liquid, such as tuning fork density meters, tuning fork level meters, ultrasonic level meters, conductivity meters, and so on. The metering of the amount of the liquid is realized by the statistics of the number of discharges.

The control device 51 can be mechanically controlled and automated.

Regarding the mechanical control method:

As shown in FIG. 1, in one embodiment, the mist catching filter screen preferably adopts a combination of the first filter screen 31 and the second filter screen 32. The control device 51 includes a flap cover drain valve 511 and a float 512. One end of the flap cover drain valve 511 is interconnected with the inner wall of the housing 1, and the other end thereof seals the liquid outlet 25. The density of the flap cover drain valve 511 is less than the density of the liquid. When the accumulated liquid surface exceeds the flap cover drain valve 511, because the density of the flap cover drain valve 511 is less than the density of the liquid, buoyancy can be generated. A connecting piece 513 is provided between the float 512 and the flap cover drain valve 511 so as to achieve a joint movement. Here, the connecting piece 513 is preferably a chain, that is, one end of the chain is fixed at the center of the float 512 and the other end thereof is fixed at the end of the flap cover drain valve 511 sealing the liquid outlet 25. When the float 512 reaches a set height, it pulls the flap cover drain valve 511 through the chain to provide a tension. When the tension and the buoyancy of the flap cover drain valve 511 itself exceeds the pressure of the liquid on the flap cover drain valve 511, the flap cover drain valve 511 is pulled up.

The side of the float 512 close to the mist catching filter screen is provided with a guide slope 5121 that is obliquely arranged downward along a direction from the central axis of the float 512 to the outside of the float 512. There is a gap between the outer wall of the float 512 and the inner wall of the housing, the gap is preferably within a range of 2 cm-5 cm.

The specific working process is as follows.

The wet gas enters the wet gas introducing pipe 22 and into the housing 1 along the tangential direction, and forms a swirling flow under the action of the housing 1. The liquid in the wet gas is thrown to the inner wall of the housing 1 due to centrifugal action, and under the action of gravity, flows down along the inner wall to the bottom of the housing 1. The gas part of the wet gas is separated into the dry gas through the two-stage the mist catching filter screen, enters the dry gas transmission pipeline 24 through the dry gas outlet 23, and is measured through the gas flowmeter 41.

The separated liquid components gather in the lower part of the housing 1 to become effusion. As the effusion increases, the float 512 gradually rises. When the float 512 reaches a set height, it pulls the flap cover drain valve 511 through the chain to provide a tension When the tension and the buoyancy of the flap cover drain valve 511 itself exceeds the pressure of the liquid on the flap cover drain valve 511, the flap cover drain valve 511 is pulled up, and the liquid enters the siphon pipe 261. The siphon pipe 261 filled with the liquid forms a siphon and drains all the effusion. Since the conditions for opening the flap cover drain valve 511 are certain, the amount of the liquid discharged from the siphon is also the same each time, and the detection counting device 52 records the discharge times of the liquid transmission pipeline 26 to measure the amount of the liquid.

When the effusion is drained, the float 512 falls and no longer pulls the flap cover drain valve 511 through the chain. However, because the density of the flap cover drain valve 511 is less than the density of the liquid, its buoyancy still guarantees that the flap cover drain valve 511 does not fall until the effusion is completely drained. At this time, under the weight of the flap cover drain valve 511 itself, the liquid outlet 25 is covered.

Figure 2:
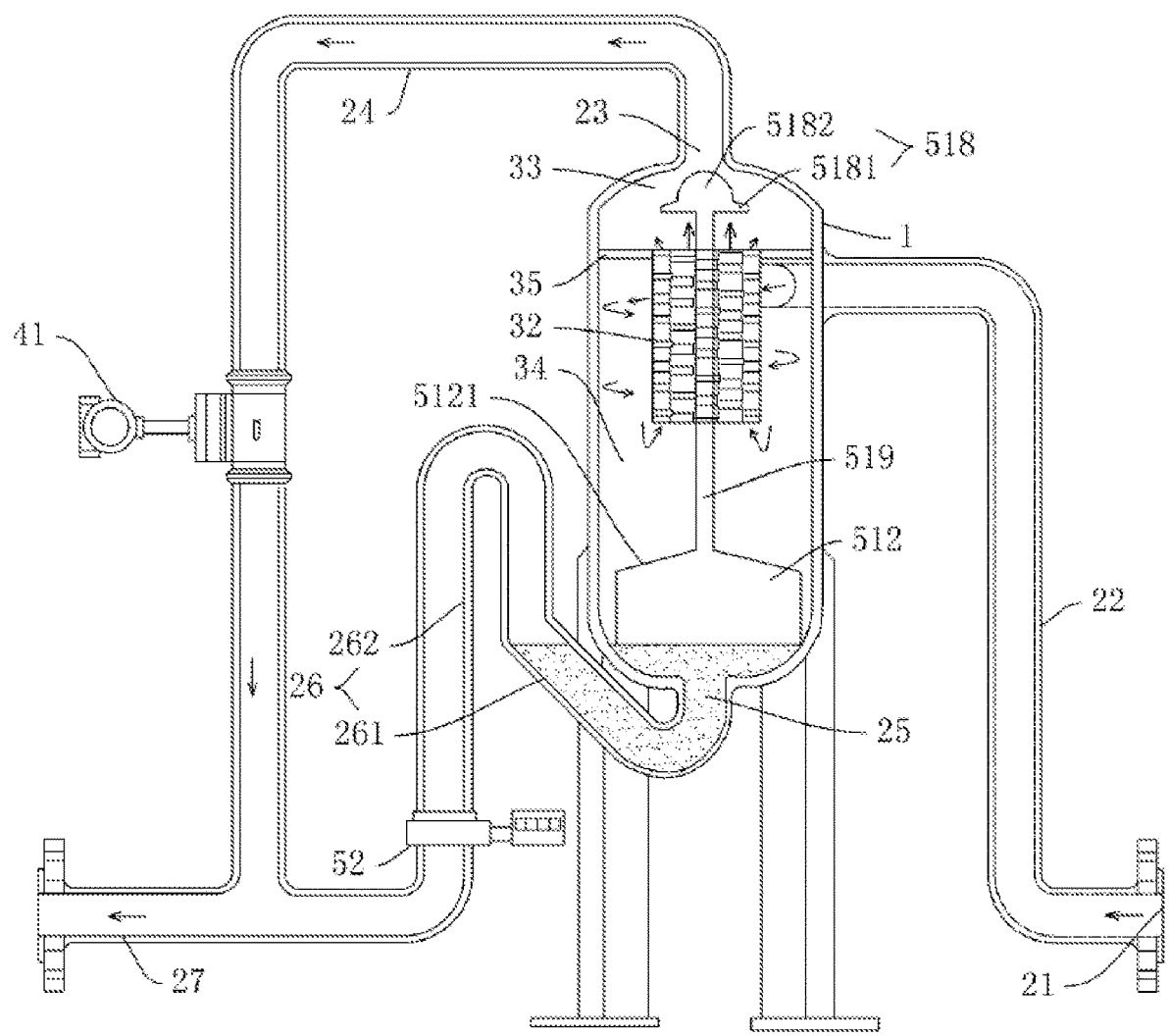
FIG. 2 is a schematic structural diagram of a mechanical control according to another embodiment of the present application.

As shown in FIG. 2, in another embodiment, the mist catching filter screen is preferably set to one layer, and the second filter screen 32 is adopted. The control device 51 includes a float 512, a sealing sleeve 518 and a connecting rod 519 connected between the float 512 and the sealing sleeve 518. The float 512 is disposed in the wet gas region 34, and the sealing sleeve 518 is disposed in the dry gas region 33 and aligned to the dry gas outlet 23 so as to close the dry gas outlet 23 or open the dry gas outlet 23 under the drive of the float 512. In particular, the float 512 in this embodiment and the float 512 in the above embodiment have the same structures, and the details will not be repeated herein. The sealing sleeve 518 includes a sealing head 5182 that abuts against an abutment block 5181 on the inner wall of the housing and is integrally connected to the abutment block 5181. The sealing head 5182 and the abutment block 5181 are made of soft rubber, which means there is a certain elastic limit. The sealing head 5182 is slightly larger than the size of the dry gas outlet 23, so that the sealing head 5182 can completely seal the dry gas outlet 23. The two ends of the connecting rod 519 are respectively integrally connected with the float 512 and the sealing sleeve 518, and at the same time the connecting rod 519 passes through the mist catching filter screen.

The specific working process is as follows.

The wet gas enters the wet gas introducing pipe 22 and into the housing 1 along the tangential direction, and forms a swirling flow under the action of the housing 1. The liquid in the wet gas is thrown to the inner wall of the housing 1 due to centrifugal action, and under the action of gravity, flows down along the inner wall to the bottom of the housing 1. The gas part of the wet gas is separated into the dry gas through the two-stage the mist catching filter screen, enters the dry gas transmission pipeline 24 through the dry gas outlet 23, and is measured through the gas flowmeter 41.

The separated liquid components gather in the lower part of the housing 1 to become effusion. As the effusion increases, the float 512 gradually rises. When the float 512 reaches a set height, the float 512, the sealing sleeve 518 and the connecting rod 519 constitute a closed air path, that is, the sealing sleeve 518 under the drive of the float 512 closes the dry gas outlet 23, at this time the liquid level of the liquid is lower than the lowest point of the siphon pipe 261 so that no siphon occurs and the liquid does not flow out. As the wet gas continues to enter and the dry gas outlet 23 is closed, the pressure in the housing 1 rises, forcing the effusion to flow to the siphon pipe 261. When the internal pressure of the housing 1 is sufficient, the effusion crosses the top of the connection of the siphon pipe 261 and the connecting pipeline 262, forming a siphon and effusion being discharged continuously. As the liquid is discharged, the liquid level of the effusion will drop, but because the pressure in the housing 1 is still high, the sealing sleeve 518 is always pressed against the housing 1 to keep the dry gas outlet 23 closed, until the pressure in the housing 1 drops to the point where the gravity of the float 512, the sealing sleeve 518, and the connecting rod 519 cannot be overcome so that the sealing sleeve 518 is separated from the housing 1 to open the dry gas outlet 23. At this time, due to the siphon effect, the liquid pipeline pressure is still higher than the gas pipeline pressure due to the additional pressure of the liquid, so the siphon process is still maintained until the liquid is fully exhausted. After the siphon process is over, since the siphon pipe 261 is completely open, there will be a small amount of the wet gas to be discharged through the siphon pipe. With the accumulation of the liquid remaining in the housing 1 and the siphon pipe 261, the siphon pipe 261 will be closed again, and cannot be passed by the wet gas. The detection counting device 52 records the discharge times of the liquid transmission pipeline 26 to measure the amount of the liquid. The amount of the wet gas passed through is basically the same each time from the siphon is finished until the siphon pipe 261 is closed again, and can be corrected through many calculations and tests, that is, the number of times of the discharge by the siphon can be multiplied by a correction value and then is added to the total flow.

Figure 3:
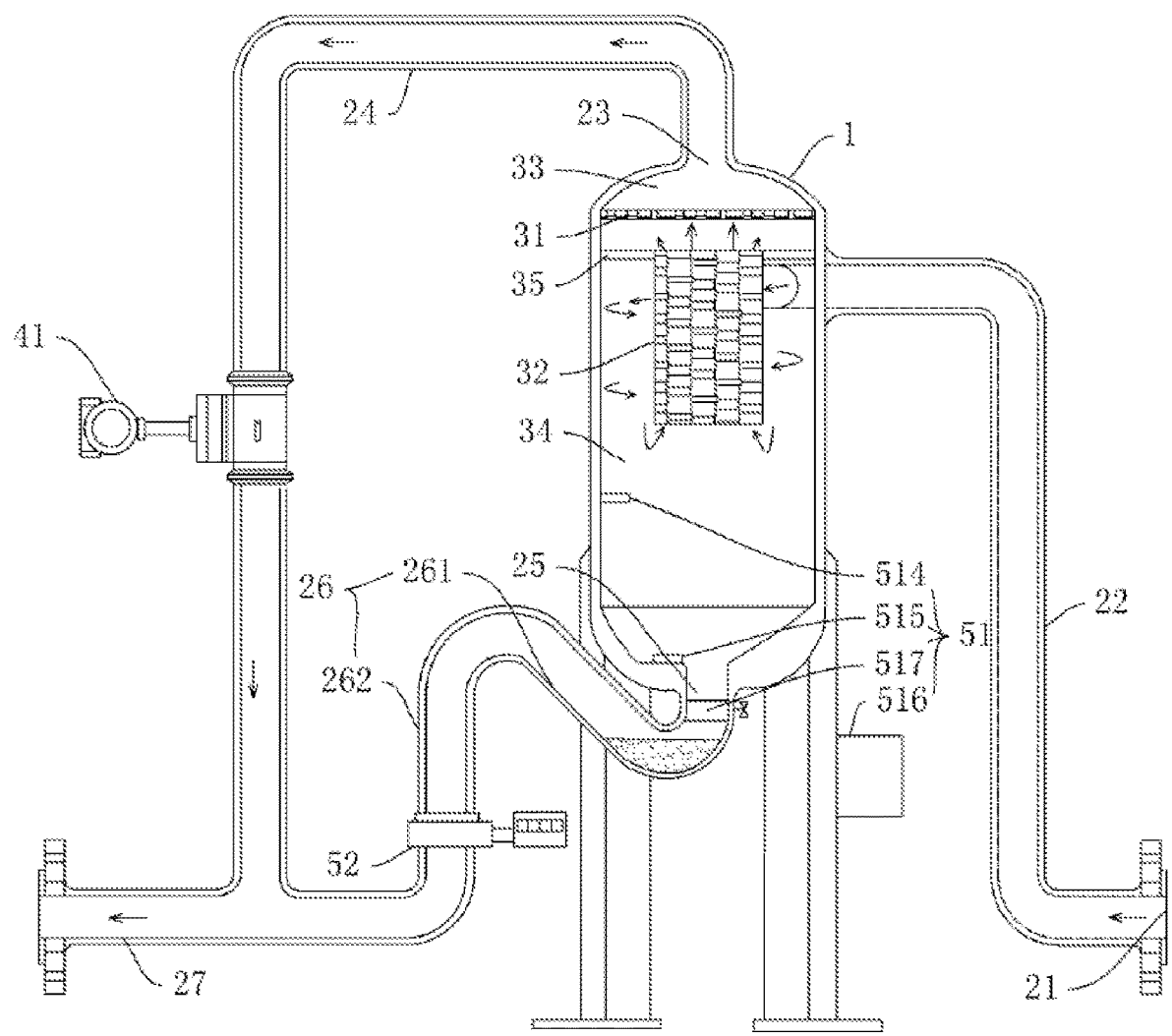
FIG. 3 is a schematic structural diagram of an automatic control according to an embodiment of the present application.

As shown in FIG. 3, regarding the automatic control method:

The control device 51 includes two liquid level sensors, a controller 516 and a solenoid valve 517. The two liquid level sensors are respectively defined as a first liquid level sensor 514 and a second liquid level sensor 515. The first liquid level sensor 514 is provided at a set height and sends a first liquid level detection signal according to the detection situation. The second liquid level sensor 515 is provided at the liquid outlet 25 and sends a second liquid level detection signal according to the detection situation. The solenoid valve 517 is provided at the liquid outlet to control the opening and closing of the liquid outlet. Here the second liquid level sensor 515 is disposed at the upper side of the solenoid valve 517. The controller 516 can be a single-chip microcomputer, PLC and other programmable control device.

The specific working process is as follows.

The wet gas enters the wet gas introducing pipe 22 and into the housing 1 along the tangential direction, and forms a swirling flow under the action of the housing 1. The liquid in the wet gas is thrown to the inner wall of the housing 1 due to centrifugal action, and under the action of gravity, flows down along the inner wall to the bottom of the housing 1. The gas part of the wet gas is separated into the dry gas through the two-stage the mist catching filter screen, enters the dry gas transmission pipeline 24 through the dry gas outlet 23, and is measured through the gas flowmeter 41.

The separated liquid components accumulate in the lower part of the housing 1 and become effusion. As the effusion increases, when the first liquid level sensor and the second liquid level sensor 515 both detect the effusion, it means that this time the effusion has accumulated to the preset height, and the solenoid valve 517 is controlled to be activated by the controller 516 to open the liquid level outlet, so that the effusion can be discharged; when the second liquid level sensor 515 does not detect the effusion, it means that the effusion at this time has been completely discharged, and the solenoid valve 517 is controlled to be disactivated by the controller 516 to close the liquid level outlet.

Since the opening and closing conditions of the solenoid valve 517 are certain, the amount of the liquid discharged from the siphon is also the same each time, and in the process of measuring the liquid flow, it can be calculated directly by the controller 516. Or the detection counting device 52 records the discharge times of the liquid transmission pipeline 26 to complete the measuring the amount of the liquid.

The above description is only preferred embodiments of the present application, and is not intended to limit the protection scope of the present application. Therefore, all equivalent changes of the structure, shape, or principle of the present application should be covered within the protection scope of the present application.

What is claimed is:

1. A self-excited wet gas flow measuring device, comprising a housing, wherein the housing is provided with a wet gas inlet for introducing a wet gas, a dry gas outlet for outputting a dry gas and a liquid outlet for outputting a liquid, a middle of the housing is mounted with a mist catching filter screen to divide a hollow cavity inside the housing into a dry gas region and a wet gas region, the wet gas inlet and the liquid outlet are both disposed in the wet gas region, the dry gas outlet is disposed in the dry gas region, a gas flowmeter for metering the dry gas is provided at the dry gas outlet, a control device for controlling opening and closing of the liquid outlet and quantitatively outputting the liquid is provided within the wet gas region, and a detection counting device for detecting whether there is a liquid output and counting is provided at the liquid outlet;
wherein a dry gas transmission pipeline is connected at the dry gas outlet, a liquid transmission pipeline is connected at the liquid outlet, the dry gas transmission pipeline and the liquid transmission pipeline communicate with each other, and a wet gas transmission pipeline is connected at a location where the dry gas transmission pipeline communicates with the liquid transmission pipeline; and
wherein the liquid transmission pipeline comprises a siphon pipe and a connecting pipeline, a first end of the siphon pipe is in communication with the liquid outlet, a second end of the siphon pipe is connected with a first end of the connecting pipeline, a second end of the connecting pipeline is in communication with the dry gas transmission pipeline, and a middle of the siphon pipe is arranged obliquely upward.

2. The self-excited wet gas flow measuring device according to claim 1, wherein the wet gas inlet has access to an inside of the housing along a tangential direction of an outer wall of the housing.

3. The self-excited wet gas flow measuring device according to claim 1, wherein the mist catching filter screen is provided with at least two layers, and a gap is formed between any two layers of the at least two layers of the mist catching filter screen.

4. The self-excited wet gas flow measuring device according to claim 3, wherein the at least two layers is two layers, respectively defined as a first filter screen and a second filter screen, the first filter screen is a plate-shaped mist catching filter screen, the second filter screen is a cylindrical mist catching filter screen, the first filter screen is provided on an upper side of the second filter screen, and the wet gas inlet is disposed on a lower side of the second filter screen.

5. The self-excited wet gas flow measuring device according to claim 4, wherein the first filter screen is fixedly connected to an inner wall of the housing, the housing is provided with a connecting plate for fixing the second filter screen and keeping the second filter screen coaxially arranged with the housing, and the wet gas inlet is disposed on a lower side of the connecting plate.

6. The self-excited wet gas flow measuring device according to claim 1, wherein the control device comprises a flap cover drain valve and a float, an end of the flap cover drain valve is interconnected with an inner wall of the housing, a second end of the flap cover drain valve seals the liquid outlet, a density of the flap cover drain valve is less than a density of the liquid, and a connecting piece is provided between the float and the flap cover drain valve so as to achieve a joint movement.

7. The self-excited wet gas flow measuring device according to claim 6, wherein a side of the float close to the mist catching filter screen is provided with a guide slope that is obliquely arranged downward along a direction from a central axis of the float to an outside of the float, and there is a gap between an outer wall of the float and the inner wall of the housing.

8. The self-excited wet gas flow measuring device according to claim 1, wherein the control device comprises a float, a sealing sleeve and a connecting rod connected between the float and the sealing sleeve, the float is disposed in the wet gas region, and the sealing sleeve is disposed in the dry gas region and is aligned with the dry gas outlet so as to close the dry gas outlet or open the dry gas outlet under a drive of the float.

9. A self-excited wet gas flow measuring device, comprising a housing, wherein the housing is provided with a wet gas inlet for introducing a wet gas, a dry gas outlet for outputting a dry gas and a liquid outlet for outputting a liquid, a middle of the housing is mounted with a mist catching filter screen to divide a hollow cavity inside the housing into a dry gas region and a wet gas region, the wet gas inlet and the liquid outlet are both disposed in the wet gas region, the dry gas outlet is disposed in the dry gas region, a gas flowmeter for metering the dry gas is provided at the dry gas outlet, a control device for controlling opening and closing of the liquid outlet and quantitatively outputting the liquid is provided within the wet gas region, and a detection counting device for detecting whether there is a liquid output and counting is provided at the liquid outlet;

wherein the control device comprises a flap cover drain valve and a float, an end of the flap cover drain valve is interconnected with an inner wall of the housing, a second end of the flap cover drain valve seals the liquid outlet, a density of the flap cover drain valve is less than a density of the liquid, and a connecting piece is provided between the float and the flap cover drain valve so as to achieve a joint movement; and wherein a side of the float close to the mist catching filter screen is provided with a guide slope that is obliquely arranged downward along a direction from a central axis of the float to an outside of the float, and there is a gap between an outer wall of the float and the inner wall of the housing.

10. A self-excited wet gas flow measuring device, comprising a housing, wherein the housing is provided with a wet gas inlet for introducing a wet gas, a dry gas outlet for outputting a dry gas and a liquid outlet for outputting a liquid, a middle of the housing is mounted with a mist catching filter screen to divide a hollow cavity inside the housing into a dry gas region and a wet gas region, the wet gas inlet and the liquid outlet are both disposed in the wet gas region, the dry gas outlet is disposed in the dry gas region, a gas flowmeter for metering the dry gas is provided at the dry gas outlet, a control device for controlling opening and closing of the liquid outlet and quantitatively outputting the liquid is provided within the wet gas region, and a detection counting device for detecting whether there is a liquid output and counting is provided at the liquid outlet; and wherein the control device comprises a float, a sealing sleeve and a connecting rod connected between the float and the sealing sleeve, the float is disposed in the wet gas region, and the sealing sleeve is disposed in the dry gas region and is aligned with the dry gas outlet so as to close the dry gas outlet or open the dry gas outlet under a drive of the float.

\* \* \* \* \*